United States Patent [19]

Gordon, Jr. et al.

[11] 4,107,927
[45] Aug. 22, 1978

[54] EBULLIENT COOLED TURBOCHARGER BEARING HOUSING

[75] Inventors: Phillip B. Gordon, Jr., Washington; Keats E. Hunt, Peoria, both of Ill.

[73] Assignee: Caterpillar Tractor Co., Peoria, Ill.

[21] Appl. No.: 745,743

[22] Filed: Nov. 29, 1976

[51] Int. Cl.² ............................................. F02B 37/00
[52] U.S. Cl. ....................................... 60/605; 60/39.08
[58] Field of Search ............................. 60/39.08, 605; 184/6.11; 417/407; 415/175

[56] References Cited

U.S. PATENT DOCUMENTS

| 2,822,974 | 2/1958 | Mueller | 417/407 |
| 2,918,207 | 12/1959 | Moore | 417/407 |
| 3,740,170 | 6/1973 | Miller | 60/39.08 |
| 3,827,236 | 8/1974 | Rust | 60/39.08 |

*Primary Examiner*—Louis J. Casaregola
*Attorney, Agent, or Firm*—Wegner, Stellman, McCord, Wiles & Wood

[57] ABSTRACT

A turbocharged internal combustion engine system including a liquid-cooled internal combustion engine, a heat exchanger for cooling the liquid, a pump for pumping cooled liquid from the heat exchanger to the engine, and a turbocharger including a rotary turbine and a rotary compressor, a housing containing the turbine and the compressor, a shaft interconnecting the turbine and the compressor and bearings journalling the shaft within the housing between the turbine and compressor. Exhaust gases from the engine are directed through the turbine to drive the same and air from the compressor is directed to the engine. A liquid passage is located in the turbocharger housing and is operatively interposed between the turbine and the bearing. The passage has a lower inlet and an upper outlet and liquid coolant from the engine is directed to the inlet. Coolant from the output is directed to the heat exchanger or other suitable compartment in the engine coolant system so as to allow flow while the engine is operating and under the following conditions. Thermosiphoning of the coolant will occur through the passage when the engine is not operative, resulting in ebullient cooling of the housing immediately adjacent the bearings when the engine is not operating. As a result, thermal damage to the bearings is prevented and coking of the residual oil on the inside walls of the housing is also prevented.

6 Claims, 3 Drawing Figures

EBULLIENT COOLED TURBOCHARGER BEARING HOUSING

BACKGROUND OF THE INVENTION

This invention relates to turbochargers and internal combustion engine systems including turbochargers.

Prior art of possible relevance includes commonly assigned U.S. Pat. No. 3,740,170, issued June 19, 1973 to Miller; and the present invention is an improvement on the invention disclosed therein.

Turbochargers are frequently employed in connection with internal combustion engines for compressing combustion air prior to its use by the engine. Typically, exhaust gases from the engine are conveyed to the turbocharger to provide the motive force for compression of the combustion air. As a consequence, the turbocharger housings are subjected to elevated temperatures of the exhaust gases requiring provision for the cooling of bearings to prevent premature failure due to thermal deterioration.

The above identified Miller patent illustrates one such construction wherein lubricating oil is directed to the bearing for the bifold purpose of lubricating and cooling the same. The Miller approach is quite satisfactory for its intended purpose in most installations. However, where the pump for the oil is engine driven and where the turbocharger runs excessively hot due to elevated exhaust system temperature or is located in a cover for fire insulation and/or noise suppression, premature bearing failure and/or turbine end oil seal failure and/or coking of the oil in the housing may nonetheless result.

In particular, once the engine is turned off, the lubricating oil will no longer be directed to the bearings to cool the same. At the same time, residual heat in the turbine section from exhaust gases will be present and cannot readily escape the turbocharger environment due to the fact that the turbocharger is enclosed in such a cover or the exhaust temperature was so high at shutdown that normal conduction overheats the bearings and seals. As a consequence, the heat of the turbine section will flow to the housing in the area of the bearings and seal and to the bearings and cause coking of the lubricant remaining in the housing and on the bearing surfaces which, in turn, will result in undesirable premature seal and bearing failure.

To avoid such a problem, it has been proposed to provide a cooling system for turbocharges for cooling the turbocharge after the engine has been shut off. Rust, in U.S. Pat. No. 3,827,236, issued Aug. 6, 1974, discloses such a system which includes an auxiliary pump which is controlled by a temperature responsive switch in the turbocharger. After the engine is shut down, and when temperatures are sufficiently high as to cause bearing damage, the auxiliary pump is driven by an electric motor to provide cooling oil until safe temperatures are attained. While the Rust system also works well for its intended purpose, it requires additional equipment in the form of switches, pumps, etc., and also imposes a drain on the battery when the engine is not running.

SUMMARY OF THE INVENTION

It is the principal object of the invention to provide a new and improved turbocharger. More specifically, it is an object of the invention to provide a turbocharger construction wherein means are provided for cooling the housing in the area near the bearings and the seal when the engine is shut off, and which are inexpensive in construction and do not require an operative power source when the engine is shut down to perform the function.

An exemplary embodiment of the invention achieves the foregoing object in a turbocharger construction including a housing having turbine and compressor chambers. A shaft is in the housing and extends between and into the chambers and bearings and seals are disposed in the housing adjacent the chambers for journalling and sealingly engaging the shaft. An impeller is mounted on the shaft within the compressor chamber and a turbine wheel is mounted on the shaft within the turbine chamber. Appropriate air and exhaust inlets and outlets are provided for the chamber. A coolant passage is disposed in the housing between the turbine chamber and the adjacent bearings in heat transfer relation to the turbine chamber and includes an upper outlet which is adapted to be connected to a heat exchanger or the like which cools engine coolant and a lower inlet which is adapted to receive the engine coolant.

Other objects and advantages will become apparent from the following specification taken in connection with the accompanying drawings.

DESCRIPTION OF THE PREFERRED EMBODIMENT

Figure 1:
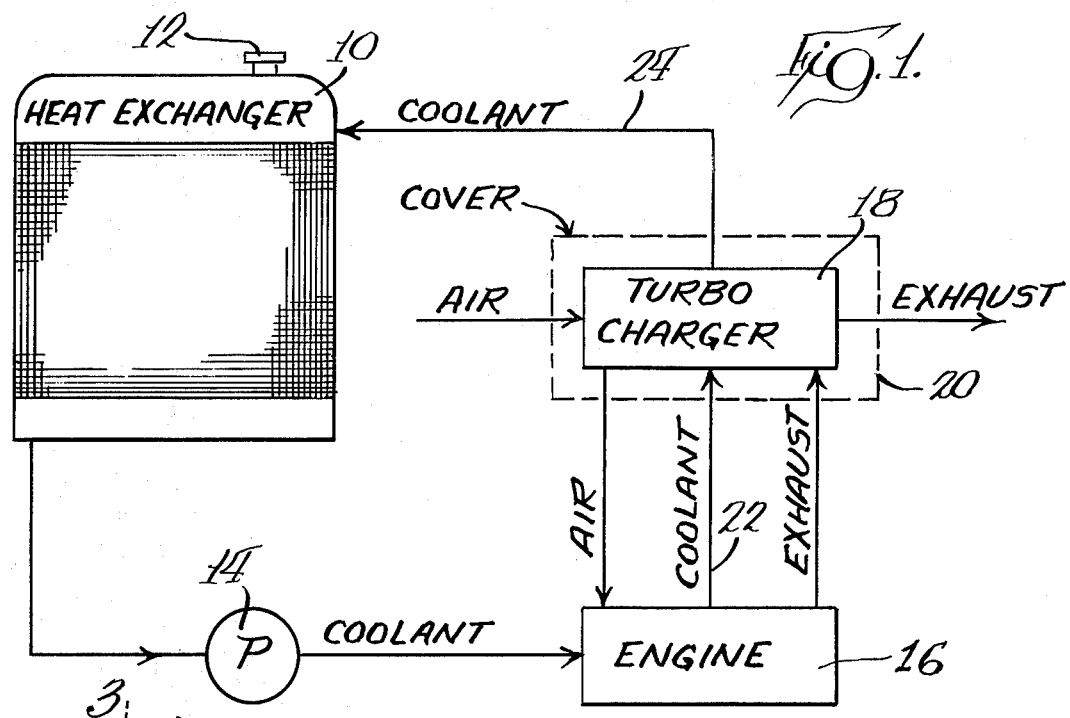
FIG. 1 is a schematic illustration of an internal combustion engine system embodying a turbocharger made according to the invention.

An exemplary embodiment of a turbocharged internal combustion engine system embodying the invention is illustrated in FIG. 1 in schematic form in a closed coolant system and is seen to include a heat exchanger 10. However, as will be seen, the turbocharger of the present invention may be advantageously employed in vented coolant systems. Illustratively, the heat exchanger 10 may include a removable pressure seal can 12 of conventional construction. Coolant, after being cooled by the heat exchanger 10 in a conventional fashion is directed by a pump 14 to an engine 16 to cool the engine. The engine, during operation, directs exhaust to a turbocharger 18 which typically may be contained in a closed cover 20 utilized for fire insulation and/or noise suppression purposes. The engine 16 receives compressed air from the turbocharger 18. Suitable means are provided so that inlet air is directed to the turbocharger and spent exhaust gases exit therefrom.

A conduit 22 extends from the coolant system of the engine 16 to the turbocharger in a manner to be described in greater detail hereinafter, while a conduit 24 extends from the turbocharger 18 to the heat exchanger 10 or other suitable engine coolant compartment to redirect coolant at an elevated temperature to the heat exchanger. In addition, means (not shown) are provided for directing engine lubricant to and from the turbocharger for the purpose of lubricating bearings employed in the turbocharger itself.

Figure 2:
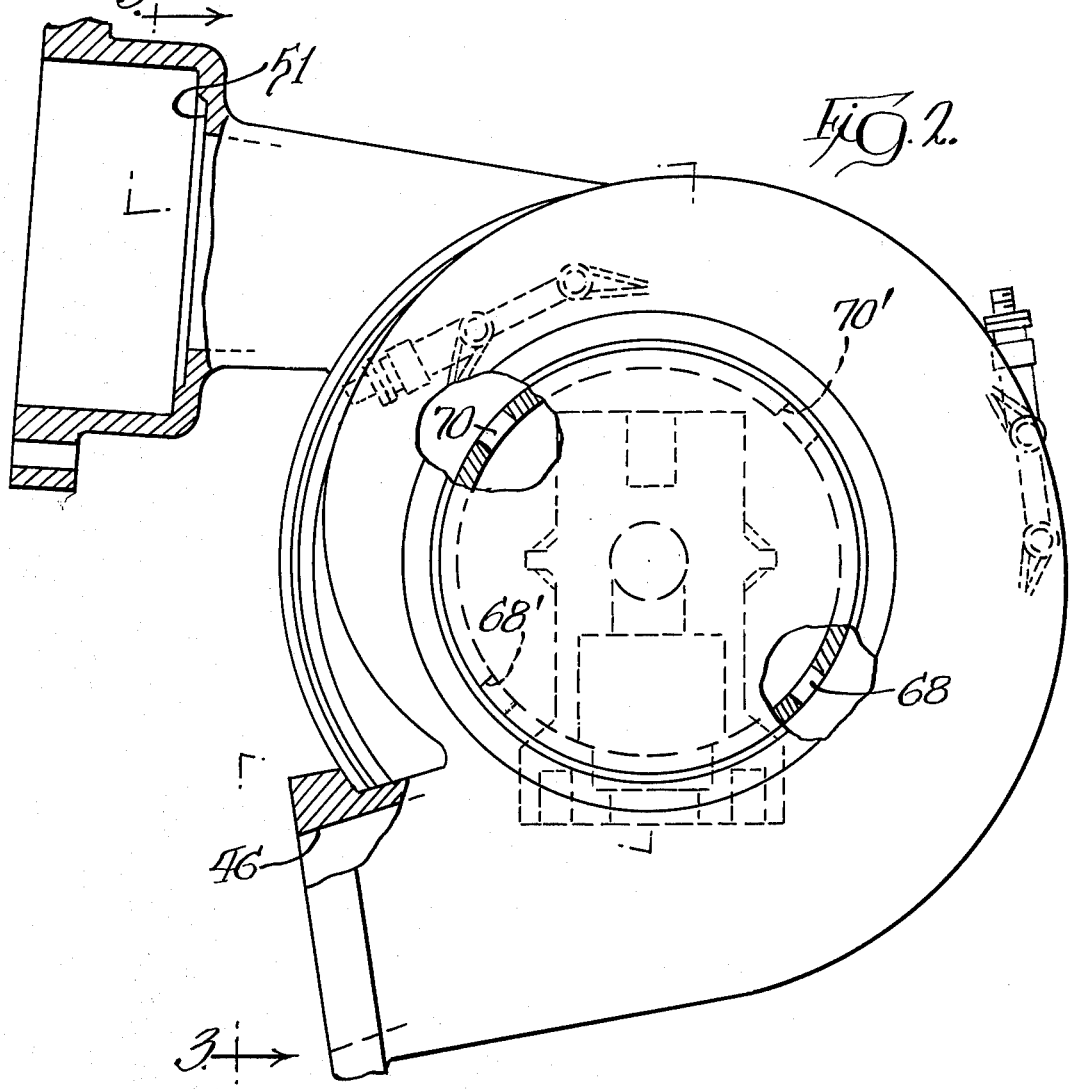
FIG. 2 is an end view of a turbocharger made according to the invention with parts broken away for clarity.
Figure 3:
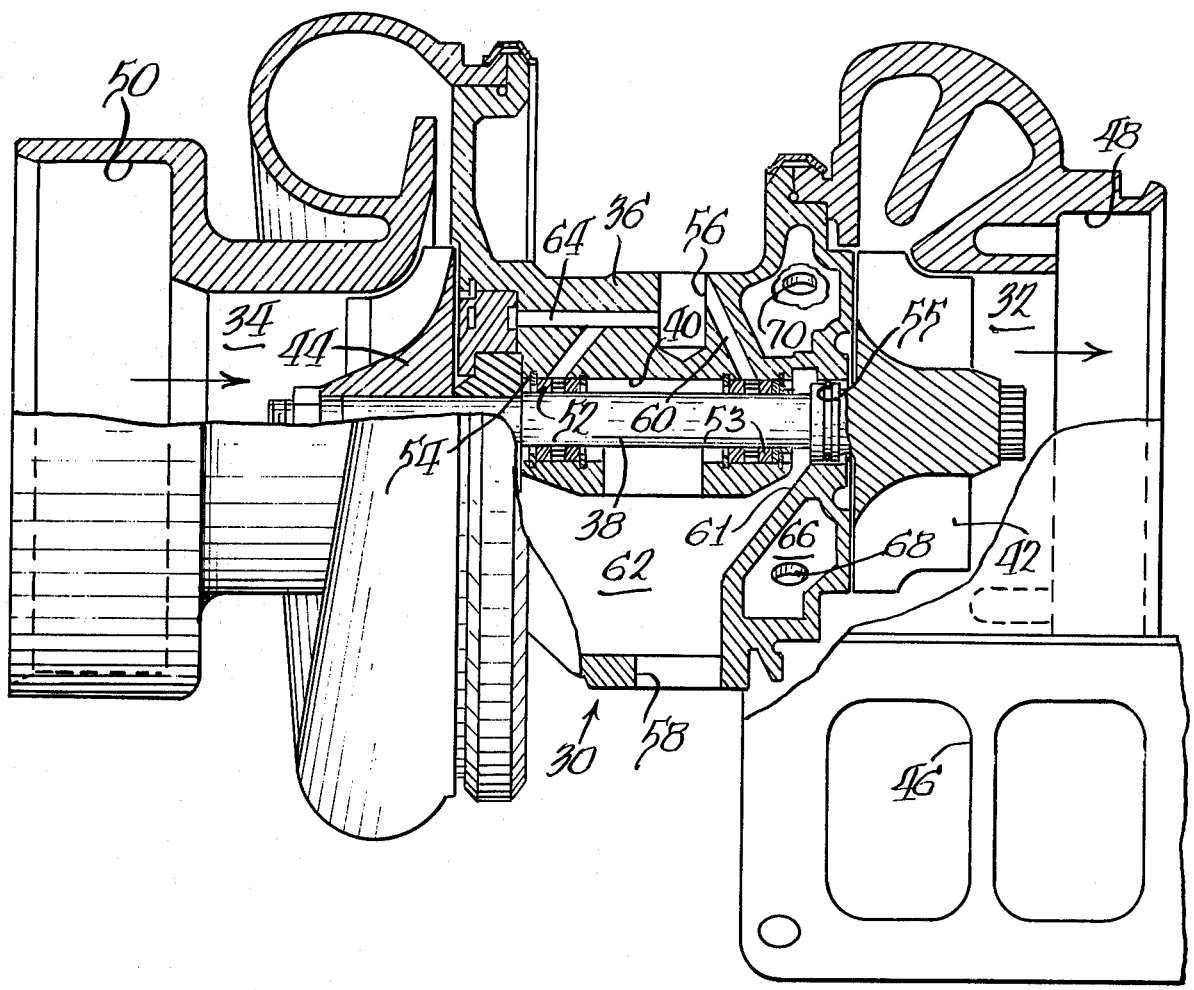
FIG. 3 is a sectional view taken approximately along the line 3—3 of FIG. 2

Referring now to FIGS. 2 and 3, the turbocharger 18 will be described in greater detail. The turbocharger 18 includes housings, generally designated 30, having at opposed ends, a turbine chamber 32 and a compressor chamber 34. The chambers 32 and 34 are separated by a journalling housing 36. A shaft 38 extends through a bore 40 in the journalling housing 36. A shaft 38 extends through a bore 40 in the journalling section 36 and into the chambers 32 and 34. Within the chamber 32, the shaft mounts a bladed turbine wheel 42 of conventional construction, while in the compressor chamber 34, a bladed impeller wheel 44 is similarly carried by the shaft.

The turbine chamber 32 includes an exhaust gas inlet 46 which may be connected to the engine 16 in a conventional fashion and through which exhaust gases will flow to impinge against the turbine wheel 42 and drive the same as well as the shaft 38. Spent exhaust gases exit the chamber 32 through an outlet 48.

The compressor chamber 34 includes an inlet 50 through which combustion air may enter the chamber 34 to be compressed by the impeller 44 when driven by the shaft 38. The chamber 34 includes an outlet 51 which is connected to the engine in a conventional fashion to deliver compressed combustion air thereto.

The journalling section 36, at opposite ends thereof, and within the bore 38, mounts bearings 52 and 53, the bearings 52 being adjacent the compressor chamber 34 and the bearings 53 being adjacent the turbine chamber 32. Seals 54 and 55 engage the shaft 38 adjacent the chambers 34 and 32, respectively, preventing the entry of gas and the exit of lubricant into and from the journalling section 36. The journalling section 36 includes an oil inlet 56 into which oil may be introduced from the oil pump of the engine 16 and an oil outlet 58 from which oil may pass back to the engine 16. Passages 60 extend from the inlet 56 to the bearings 53 to deliver lubricating oil thereto. Oil emanating from the bearings 53, after lubricating and cooling the same, will impinge upon a surface 61 adjacent the seal 55 flow to the outlet 58 via a chamber 62 in the journalling section 36. Similar passages 64 direct lubricating and cooling oil to the bearings 52 and other components adjacent the compressor chamber 34, generally in the manner disclosed in the previously identified Miller patent, the deatils of which are incorporated by reference.

Interposed between the bearings 53, which are adjacent the turbine chamber 32, and the turbine chamber 32, and adjacent to the seal 55 and in heat transfer relation with such components is an annular chamber 66 which surrounds the shaft 38. The chamber 66 includes a lower inlet 68 which is adapted to be connected to the coolant system of the engine 16 to receive coolant therefrom. The annular chamber 66 also includes an upper outlet 70 which is adapted to be connected to the heat exchanger 10.

As a result of the foregoing, it will be appreciated that engine coolant will flow through the chamber 66 from the bottom to the top thereof to the heat exchanger 10 to provide some cooling action for the bearings 53 during operation of the engine 16. However, during engine operation, principal cooling of the bearings 53 takes place by reason of the passage of oil thereto through the passages 60.

However, when the engine is turned off, the oil pump associated therewith will no longer deliver oil to cool the bearings 53 and some oil will remain within the bearings 53 or the seal 55 and on the surface 61 of the chamber 62. Heat from the hot turbine chamber 32 adjacent to the bearings 53, seal 55 and the chamber surface 61 could cause such residual lubricant to coke up if such heat transfer were not impeded. In the present invention, when employed in a closed coolant system as illustrated, such heat transfer is impeded by the provision of the engine coolant in the chamber 66 which will flow therethrough after the engine has been turned off, due to thermosiphoning. As can be ascertained from FIG. 1 and the foregoing description of the specifics of the turbocharger construction, by virtue of the location of the inlet and outlet cooling passages, hot coolant and steam will rise and be replaced by fresh coolant from engine system supply. That is, coolant will thermosiphon through the chamber 66. Ebullient cooling will then occur in the chamber 66, principally on the wall thereof shared by the turbine chamber 32 to cool the same. To the extent that any vapors generated by such ebullient cooling do not condense within the chamber 66, they will exit through the upper outlet to the heat exchanger where condensation will occur to continue to the draw of coolant through the chamber 66. The action will continue until such time as an equilibrium is attained. At that point, the temperature of the turbine chamber 32 will be considerably reduced from its operating temperature to a low level whereat coking of lubricant at the bearings 53, seal 55 and surface 61 will not occur. Thus, long life of such bearings and seals is assured.

The invention may also be utilized in vented coolant systems so long as the outlet 70 of the chamber 66 is at or below the upper surface of the coolant employed to insure that the chamber will always be filled with coolant. In such a system, thermosiphoning will not occur but ebullient cooling will, rapidly lowering the temperature of the turbocharger in the vicinity of the bearings 53, the seal 55 and the surface 61 to the boiling point of the coolant to prevent coking of the lubricant.

In general, it is not necessary to provide similar means for cooling the bearings 52 in that, being adjacent the air inlet 50, incoming air will be sufficiently cool so as to maintain those bearings at a low level temperature when the engine is shut off.

While the invention has been described and illustrated with the turbocharger in series with the engine and the heat exchanger, other coolant routes may be employed. For example, coolant from the outlet 70 could be returned to the engine above the level of the outlet 70. Alternatively, the coolant route shown in FIG. 1 could be in parallel with an additional coolant route directly from the engine to the heat exchanger.

From the foregoing, it will be apparent that a turbocharger made according to the invention ensures adequate cooling of bearings even after the engine is turned off in a relatively severe operating environment, such as a closed housing. It will also be appreciated that auxiliary equipment, such as an auxiliary pump, control switches, and an auxiliary power source other than the engine are not required. As a consequence, an internal combustion engine system embodying a turbocharger made according to the invention can be fabricated with a minimum of expense and yet will have long life.

What is claimed is:

1. In a turbocharged, internal combustion engine system, the combination of:
 a liquid cooled, internal combustion engine;
 a heat exchanger for cooling the liquid from the engine;
 a turbocharger including a rotary turbine and a rotary compressor, housings containing the turbine and the compressor, a shaft interconnecting the turbine and the compressor and bearings journalling the shaft within the housing adjacent the turbine;

means for directing exhaust gases from said engine to said turbine to drive the same;

means for directing air from said compressor to the engine;

a liquid passage in said housing operatively interposed between said turbine and said bearings and having a lower inlet and an upper outlet;

means for directing liquid coolant from said engine to said inlet; and means for directing coolant from said outlet to said heat exchanger whereby thermosiphoning of said coolant through said passage will occur when said engine is not operative and ebullient cooling of said housing immediately adjacent said bearings will occur to the presence of liquid in said passage to thereby prevent excessive heat buildup in said housing even when said engine is not operative and thereby prevent thermal damage to said bearings.

2. The system of claim 1 further including an oil inlet and an oil outlet in said housing and including an oil passage extending to said bearings, liquid coolant in said passage cooling said bearings to prevent the coking of the oil therein even when said engine is nonoperative.

3. The system of claim 2 wherein said heat exchanger includes a pressure seal and is operative to contain fluid under elevated pressure during operation of said engine.

4. The system of claim 1 wherein said liquid passage comprises an at least partially annular chamber disposed about said shaft.

5. A turbocharger for use with a liquid cooled, internal combustion engine comprising:

a housing including turbine and compressor chambers;

a shaft in said housing extending between and into said chambers;

bearings in said housing adjacent said chambers and journalling said shaft;

an impeller mounted on said shaft within said compressor chamber;

a turbine wheel mounted on said shaft within said chamber;

an air inlet and an air outlet in said compressor chamber;

an engine exhaust inlet and an engine exhaust outlet in said turbine chamber;

an annular or partly annular liquid coolant receiving chamber in said housing about said shaft and between and sealed from said turbine chamber and said adjacent bearings;

an upper liquid engine coolant outlet for said annular or partly annular chamber;

a lower liquid engine coolant inlet for said chamber; and lubricant passages separate from said chamber and coolant inlet and outlet and extending to said bearings.

6. A turbocharger for use with a liquid cooled, internal combustion engine comprising:

a housing including turbine and compressor chambers;

a shaft in said housing extending between and into said chambers;

bearings in said housing adjacent said chambers and journalling said shaft;

an impeller mounted on said shaft within said compressor chamber;

a turbine wheel mounted on said shaft within said turbine chamber;

an air inlet and an air outlet in said compressor chamber;

an engine exhaust inlet and an engine exhaust outlet in said turbine chamber;

an engine coolant receiving passage in said housing between said turbine chamber and said adjacent bearings and in heat transfer relation to but sealed from said turbine chamber;

at least one lower, liquid engine coolant inlet in said housing for said passage;

at least one upper, liquid engine coolant outlet for said passage;

lubricant passages in said housing extending to said bearings, said lubricant passages being separate from said coolant passage; and at least one inlet and outlet in said housing for said lubricant passages.

* * * * *